United States Patent [19]

Mowry, Jr. et al.

[11] 4,310,180

[45] Jan. 12, 1982

[54] PROTECTED DOCUMENT AND METHOD OF MAKING SAME

[75] Inventors: William H. Mowry, Jr., Ionia; Michael J. McElligott, Rochester; Victor J. Tkalenko, Jr., Rochester; Joseph Baran, Rochester, all of N.Y.

[73] Assignee: Burroughs Corporation, Detroit, Mich.

[21] Appl. No.: 171,318

[22] Filed: Jul. 23, 1980

Related U.S. Application Data

[60] Division of Ser. No. 798,219, May 18, 1977, Pat. No. 4,265,469, and a continuation of Ser. No. 958,928, Nov. 8, 1978, abandoned.

[51] Int. Cl.³ .............................................. B42D 15/00
[52] U.S. Cl. ................................... 283/8 B; 283/8 R; 355/133
[58] Field of Search .............. 283/8 R, 8 A, 8 B, 9 R; 355/133; 428/915, 916

[56] References Cited

U.S. PATENT DOCUMENTS

| | | | |
|---|---|---|---|
| 776,515 | 12/1904 | Ives | 428/195 |
| 1,002,600 | 9/1911 | Morris et al. | 283/8 B |
| 1,114,346 | 10/1914 | Farmer | 283/8 R |
| 1,428,278 | 9/1922 | Dow | 283/8 B |
| 1,689,302 | 10/1928 | Smith | 283/8 A |
| 1,692,405 | 11/1928 | Freeman | 283/8 B |
| 3,675,948 | 7/1972 | Wicker | 283/6 |
| 3,852,088 | 12/1974 | Godlewski et al. | 283 8 B/ |
| 3,887,742 | 6/1975 | Reinnagel | 283/8 R |
| 4,025,673 | 5/1977 | Reinnagel | 283/6 |

FOREIGN PATENT DOCUMENTS 2401251  9/1974  Fed. Rep. of Germany ..... 283/8 R

OTHER PUBLICATIONS

Memo of the Xerox Corporation dated May 22, 1975, from R. F. Lehman to A. Morganstein.
McDonald's Gift Certificate.
Sample of "Kids Paper" by McGhee printing service of Stamford, Conn.

*Primary Examiner*—Paul A. Bell
*Attorney, Agent, or Firm*—Edward J. Feeney, Jr.; David G. Rasmussen; Kevin R. Peterson

[57] ABSTRACT

Disclosed is a protected document such as a negotiable instrument, a title instrument, identification document or other documents which should be kept secure from illegal copying by color copiers. The method of making the document comprising preprinting a "void" or other warning or cancellation phrase pattern in half tone or multitone on the document and camouflaging this pattern is also disclosed.

1 Claim, 5 Drawing Figures

PROTECTED DOCUMENT AND METHOD OF MAKING SAME

This application is a continuation of application Ser. No. 958,928, filed 11/8/78 now abandoned and a division of Ser. No. 798,219 filed 5/18/77 now U.S. Pat. No. 4,265,469.

BACKGROUND OF THE INVENTION

In the prior art there were many ways of making a document safe from alteration. Prior art techniques, for the most part having been based upon the utilization of chemical formulations which are or may be employed as either an overlay on the top surface of the document to be protected or as an overprinted area on such documents. In some instances a chemical wash of the entire paper stock is utilized.

With the advent of xerographic color copiers such as the Xerox L-6500 color copier or similar machines and their proliferation, the problem of nefarious reproductions has dramatically increased. The quality of the color reproduction at this point in the art is such that it is very difficult, often impossible, to discern whether the copied document is the original or a color copy. The reproduction of checks, stock certificates, automobile title instruments, etc. can be readily accomplished. Criminals having access to them and to a color copier may effectively duplicate these negotiable instruments via copying the registrations and title instruments so that they can be matched with the stolen vehicle. Copying checks and other personal identification documents can also be rewarding to the criminal. As the copier systems will proliferate so will their usage and the opportunity for many persons to make improper copies for questionable use.

In copending application Ser. No. 766,590 filed Feb. 8, 1977, now abandoned entitled "Protection System for Documents", incorporated herein fully by reference, there has been disclosed a system for protection of documents which employs a masked warning mark which when copied appears on the copy due to its effective color density being above the color reproductive threshold density of the copier. The mask is of a color density which is below the color reproductive density of the copier. An overlay of the mask and the warning phrase which has a color density exceeding the color reproductive threshold density causes the warning to appear on color copies.

That system was developed as an improvement over U.S. Pat. No. 3,802,724. It was developed as a solution to the color copier problems even in view of the fact that, as was known among those working on this problem in private laboratories, the resolving power of the Xerox L-6500 color copier causes larger dots to stand out prominently while smaller dots become less pronounced over a wide range of color copier settings. Experimentation had been done utilizing two different common tone screens as for instance 65 lines per inch and 133 lines per inch of substantially equal density, but the result was an effect which was not satisfactory. Accordingly the density threshold approach was conceived and implemented as described in the aforementioned application.

Modification of the exposure and/or development times of the master negatives could produce a sufficiently uniform tone and conceal the cancellation phrase from the casual observer. However, careful observation by a more critical observer permitted one to distinguish the cancellation phrase which was hidden by the dual screens of substantially equal density.

Accordingly the system in which a mask is of a color density which is below the color reproductive density of the copier and the overlay of the mask and warning phrase has a color density exceeding the color reproductive threshold density of the copier was developed and used.

SUMMARY OF THE INVENTION

It is the principal object of this invention to improve the ability to thwart nefarious copies of instruments of authentication, title, identification, be they bearer, negotiable or non-negotiable, or the like. The application is directed to our improvement which employs a masked warning mark, which when copied, appears on the copy due to the inability of the known systems of the existing color copiers to integrate a composite pattern so that as a result it is possible to conceal a cancellation phrase from the casual and critical observer of the original document yet the lens system of the copier will cause the cancellation phrase to become visible on the copy made of the original document over a wide range of machine settings available in some copiers.

Like prior unsuccessful attempts, we employ a cancellation phrase pattern composed of two or more screen tones. In addition, during the preparation of the composite mask or plate, a random line background mask is utilized for camouflaging the composite screen tones so that the screened cancellation phrase does or very nearly does disappear into the background design.

It is an additional important feature of our improvement in that the tone screens have a common multiple so that it is possible to align the screens so that their lines are parallel and so that a moire pattern is avoided. In one preferred embodiment, one screen with twice the dots per linear inch is used.

Before going into our invention in detail, reference should be had to the attached drawings in which.

Figure 1:
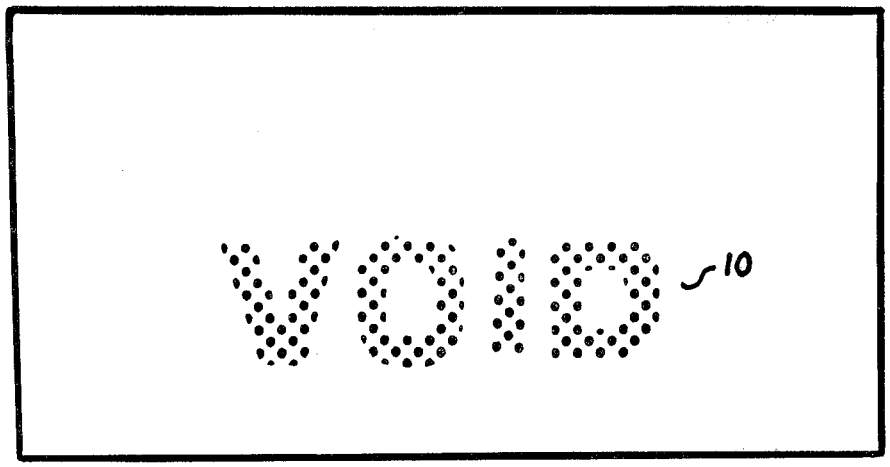
FIG. 1 is a sample positive mock up of the void pattern for a document in accordance with the preferred embodiment of our invention showing the positive cancellation phase which is used to prepare the master negative for reproduction.

With reference to the drawings, it must be appreciated that Patent Office requirements for solid black line drawings on a white surface make illustration of some of the subtleties of our invention relating to screen tones and color tones difficult by the required Patent Office drawings alone. Reference to the following detailed description of the illustration will make full appreciation of the drawings and our invention possible.

In the drawings we have used dots spaced nine to the lineal inch and eighteen to the lineal inch to represent a corresponding 65 lines to the inch and 130 lines to the inch which are actually used in our preferred embodiment. In this one preferred embodiment it will be found that this common multiple is best. However, as will be espoused below, it is possible to use other multiples.

In FIG. 1 the warning phrase 10, namely "VOID" is shown as a positive representation with dots included. This warning phrase 10 is prepared initially as a solid line image of the size represented by the dotted representation and photographed both in positive and in reverse line images. The solid line image can be prepared by conventional photocomposed master techniques. The dots are added in additional steps by conventional photomechanical techniques, namely by exposure with a screen dot image on film.

Figure 2:
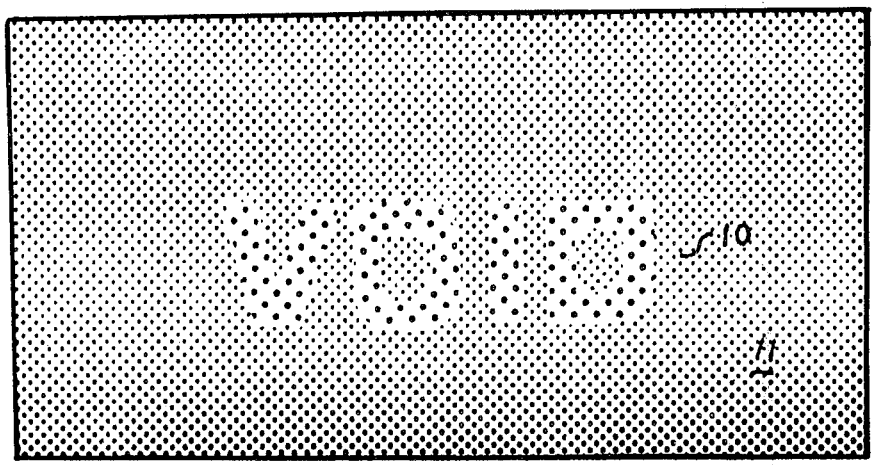
FIG. 2 is a composite positive made with two screens by superimposition of the screen pattern of FIG. 1 bordered by that of a second smaller pitch screen.

As shown in FIG. 2 a composite negative including the warning phrase 10 surrounded by the smaller pitch background tone 11 is prepared so as to present the warning phrase 10 appearing within the smaller pitch background 11. In our preferred embodiment we would illustrate the word "VOID" in 65 pitch and a background in 130 pitch, the word "pitch" being understood to mean number of lines per linear inch in both directions.

The background screen 11 is fitted over the cancellation or warning phrase 10 in noncumulative mode.

Figure 3:
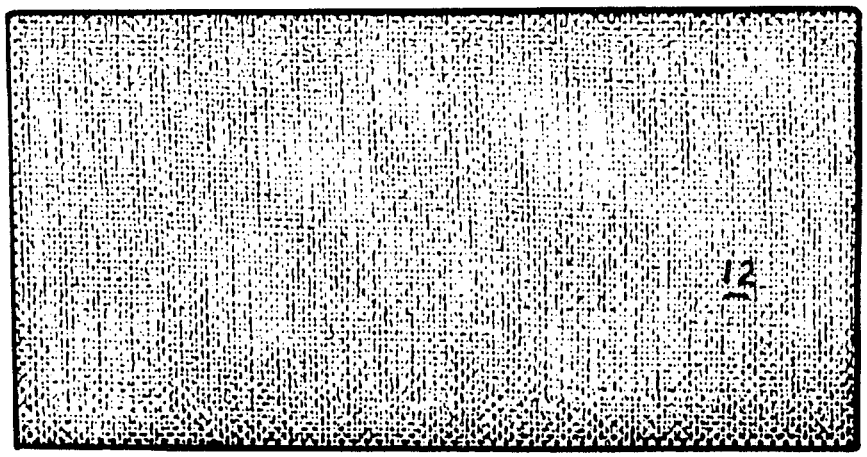
FIG. 3 is a composite master positive of the masking screen.

As shown in FIG. 3 a camouflage pattern hiding the tones of FIG. 2 is included in the composite mask 12 of the tone pattern shown in FIG. 2 so as to mask the underlying tones and the cancellation phrase 10. This camouflage pattern mask 12 becomes a part of the master so that not even a critical observer can easily see the cancellation phrase beneath or as part of the camouflage. Here we should say that by the word "tone" we would prefer to exclude full tones and include half tones, screen tints and screen tones or other tones which have changing densities going across the boundry.

Figure 4:
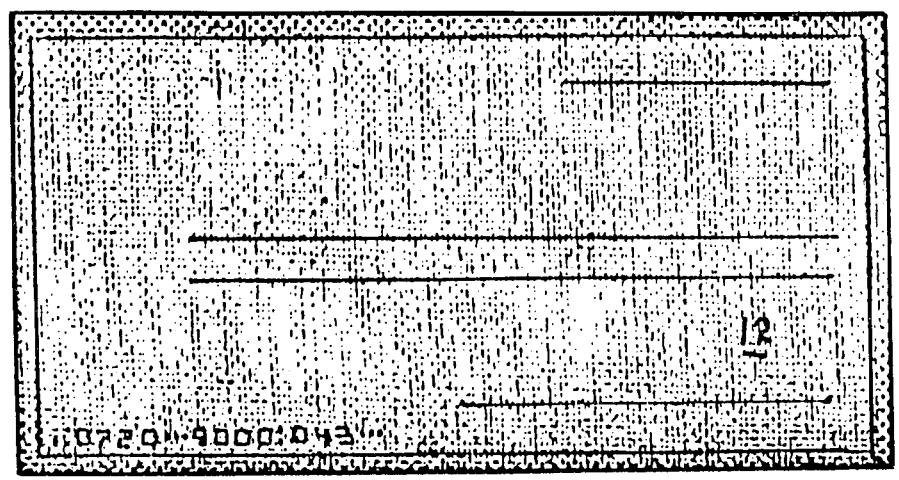
FIG. 4 is a completed document preprinted with lines as a check would be in accordance with our preferred embodiment.

As shown in FIG. 4 utilizing the mask prepared in accordance with FIGS. 1 through 3, the document can be printed on ordinary paper or on conventional safety paper as a check would be. It may be printed with ordinary ink as illustrated by the solid lines and with numerals as illustrated by the representation of the MICR code representing the bank involved.

In our preferred embodiment of the invention as illustrated in FIGS. 3 and 4, the pattern is printed on the surface of Burroughs (Registered Trademark) Safety Paper as will be described more fully below.

Figure 5:
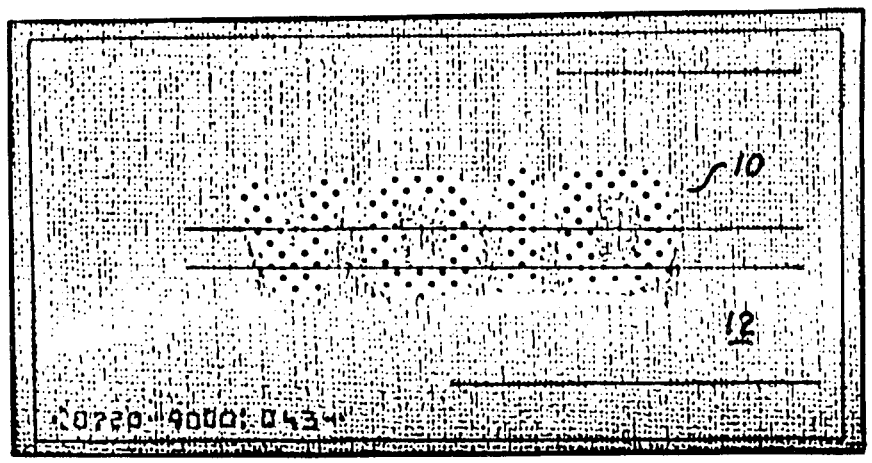
FIG. 5 is an illustration of the kind of reproduction which would be obtained by reproduction on a Xerox L-6500 color copier of the document of FIG. 4.

As shown in FIG. 5, when the document of FIG. 4 is reproduced on a Xerox L-6500 copier, the warning phrase 10 appears on the copy in spite of the camouflage mask 12.

It will be appreciated by those skilled in the art that the most commonly used tone screens are 55, 65, 85, 100, 120, 133 and 150 line screens. Normally 133 and 150 line screens are used for printing half tones on coated paper when a very high quality reproduction is required. In this use, 133 line screens prove unsuitable because of the moire pattern which results when it is superimposed with a 65 line screen. Therefore the equal multiple ratio screen is an important aspect of our invention. Dots are registered so as to be noncumulative or coherent, so that they come out "in step" or in phase. By this means we minimize irregularities at the boundaries between the screens.

Registration of the screens is done by means of registration pins. The preparation of the special equal multiple screen sets reduces the interference at joints of partial dots over printed dots or irregular open areas. By the use of the registration pins it is possible to align the screens so that their lines are parallel but one screen is twice the pitch of the other. Careful handwork is this registration can knit the two screens together without having any dots either superimposed or missing along the adjoining line.

Other line screens at 45° or other angles can be used to bring the lines per inch of the background screen and the cancellation phrase closer together if so desired.

The random line background 12 such as often utilized in Burroughs Pantagraph Safety Papers gives increased concealment under most conditions. The random pattern breaks up the regular lines used for the cancellation phrase as uniform screen background.

When this is overprinted on a safety paper which has colored pattern additional possibilities may be noted. In one preferred embodiment as shown in FIG. 4, but impossible to illustrate due to the color requirements, the camouflage mask 12 of FIG. 4 is printed on a background which has a pink tone. The printing of the camouflage mask and the half tones may be as dots of black and gray. Because of the background size of the half tones and features of the camouflage mask, the ability of the copier is greatly reduced and it cannot resolve the conflicting inputs by its lens system. Accordingly in FIG. 5 the "VOID" pattern comes through as a reddish color while the camouflage mask fades into various light colors such as a mixture of blue, red and green and yellow.

This is because the colors of the Xerox copier are formed of combinations of cyan, magenta and yellow. For some reason, when the composite is a black placed upon a pink background, then the magenta is the color which appears as the "VOID" warning on the copy. The very fine screened dots are not resolved by the lens system of the copier and appear generally as white. The camouflage mask appears in this instance generally as a bluish tone but this varies depending on copier settings. It will be understood that we have described a black printed on pink background commonly used on checks, but that other colors and tints may be equally effective as will be shown by experimentation. We have found that browns, dark greens and many others will work well as a background. We prefer to print a color which is a composite of the basic copier color as this seems to make the lens system have a more difficult time accomplishing resolution and causes the resultant warning to be more distinct on the copy.

As will be appreciated by those skilled in the preparation of masks after review of the method that the preparation of the master is difficult. After the "VOID" or warning phrase is created, it is first obtained in a positive and its reverse and the dots are added by the double exposure with screens. To obtain FIG. 1, a 65 line positive image screen is double exposed with the solid line film positive. To obtain FIG. 2, first a 130 line screen is double exposed with the reverse solid line film of the warning mark with the "VOID" absent. The "VOID" is added by double exposing again the image of FIG. 1 containing the dots and the intermediate positive 130 line background screen. This will complete the preparation of FIG. 2.

The contact negative composite of the image of FIG. 2 is exposed together with the camouflage film which appears as FIG. 3.

This is preferably done in pin registry by first placing the two films over the register pins and then double exposing them onto a third piece of film.

This is done by a double exposure of both the composite contact negative and with the camouflage line screen.

The result is the finished master negative which will be used for printing plates.

The pattern of the camouflage may be of the Fibril type, such as would be made by nonwoven fabric, by a Flake pattern or by a rough woven filter fabric such as Burlap.

The various ink colors for the background may be also formed of more conventional colors, with the scope of our invention. These would include the clear light colors formed by a screen of green, red or blue. However, we have also found that when the line image shown in FIGS. 4 and 5 as would be overprinted on the background is combined with another overlay of neutral density screen such as would be used in block headings on business forms, the gray type color which is seen when viewed by the naked eye is "seen" by the color copiers as additional density which must be synthesized from the basic colors of the copier. It will appear as a darker background instead of gray when copied, if the background is a different color.

While the overlay camouflage is shown in its preferred embodiment as a solid pattern overlay. The overlay may be interspersed with the background tone void marks in a composite pattern as for instance a basket weave pattern, scroll or the like so that the pattern is separated but the eye confused. Preferably Pantagraph patterns would still be used. The camouflage can be printed in metameric colors for additional security.

Alternately on the press, plates may be staggered so that different alternate background colors may be used.

In addition, or separately background printed with areas of different color densities may be used for the camouflage pattern.

Multiple screened image at different selected densities will give a wider range of protection than can be achieved with a single screened image.

The darker areas or blocks will markedly distort at the darker settings of the copier and thereby add to the protection achieved.

Overprinting, as mentioned above with various screens for blockheadings, photographs and the like often used on conventional checks may be used to produce the effects which result only on copies and not on the original.

After having reviewed our description in detail various modifications and rearrangements may be made by those skilled in the art both now and in the future as may occur through experimentation or by analysis.

For instance, other multiples of screens other than two to one, such as three to one, three to five and other coherent multiple combinations will be found suitable especially together with rearrangement of the size of the warning phrase. We prefer to use a warning phrase in the range of 2 cm by 10 cm to 6 cm by 30 cm, although other sizes may later prove desirable.

In addition other color combinations will be found suitable even though we prefer black or dark browns, dark reds, dark greens, and dark blues as they are difficult to synthesize from cyan, magenta and yellow.

Such experimentation and analysis is contemplated and our invention is defined by the scope of the claims which follow, the language of which may well point the way to such further experimentation contemplated thereby.

What is claimed is:

1. A method of making copy-proof document which prevents exact duplication of said document by causing the copy of said document to indicate its lack of orginality, said method comprising the steps of:

applying a first less than full tone background color image to the original document substrate in a form which denotes its invalidity, which first image is composed of dots of a size which are reproducible by a color copying machine such as the Xerox model 6500 or the like;

next, applying a second less than full tone background color image to the original document substrate in those areas of the original document substrate not covered by said first image, which second image is composed of dots of a size which are not reproducible by said copying machine;

finally, applying a third background color camouflage random image over the entire area of the original document substrate, which third camouflage random image substantially masks the invalidity form of the first color image on the original document and which is also not reproducible by said copying machine to thereby provide an original document in which any sign of invalidity is substantially invisible, but which sign of invalidity is noticeably reproduced upon any color copy of said original document.

* * * * *